(12) United States Patent  
Watanabe

(10) Patent No.: US 8,391,633 B2  
(45) Date of Patent: Mar. 5, 2013

(54) IMAGE DISCERNMENT APPARATUS

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 12/142,563

(22) Filed: Jun. 19, 2008

(65) Prior Publication Data

US 2008/0253684 A1    Oct. 16, 2008

Related U.S. Application Data

(63) Continuation of application No. PCT/JP2005/023338, filed on Dec. 20, 2005.

(51) Int. Cl.
*G06K 9/40*        (2006.01)
(52) U.S. Cl. ...................... 382/274
(58) Field of Classification Search .................. None
See application file for complete search history.

(56) References Cited

U.S. PATENT DOCUMENTS

| | | | | |
|---|---|---|---|---|
| 4,051,511 | A * | 9/1977 | Poetsch | 348/655 |
| 4,965,664 | A * | 10/1990 | Udagawa et al. | 358/521 |
| 6,181,321 | B1 | 1/2001 | Zhao et al. | |
| 7,010,160 | B1 * | 3/2006 | Yoshida | 382/162 |
| 2002/0126315 | A1 * | 9/2002 | Nabeshima | 358/3.03 |
| 2003/0118234 | A1 * | 6/2003 | Tanaka et al. | 382/173 |
| 2004/0208366 | A1 * | 10/2004 | Kuwata | 382/171 |
| 2005/0017931 | A1 * | 1/2005 | Toyoshima et al. | 345/76 |

FOREIGN PATENT DOCUMENTS

| | | |
|---|---|---|
| JP | 10-302061 | 11/1998 |
| JP | 2002-247361 | 8/2002 |
| JP | 2003-169231 | 6/2003 |
| JP | 2003-337944 | 11/2003 |
| JP | 2004-341901 | 12/2004 |

OTHER PUBLICATIONS

Hiroshi Kano., "Digital Camera Photographing Technique for Printing Work Flow", Aug. 2004, pp. 1-9.
International Search Report mailed Jan. 24, 2006 in connection with the International application PCT/JP2005/023338.
Japanese Office Action issued Feb. 15, 2011 in corresponding Japanese Patent Application 2007-550953.

* cited by examiner

*Primary Examiner* — Bhavesh Mehta
*Assistant Examiner* — Nirav G Patel
(74) *Attorney, Agent, or Firm* — Staas & Halsey LLP

(57) ABSTRACT

Circumscribing pixels in the surroundings of an obtained image are obtained and the gradation levels of the circumscribing pixels are compared with a predefined threshold value. The number of circumscribing pixels of which the gradation level is smaller than the predefined threshold value is counted, and, if the number of circumscribing pixels, of which the gradation levels are relatively small, is larger than the number of circumscribing pixels in the surrounding of the image, the image is judged to be a low-key image. In contrast, if the number of circumscribing pixels, of which the gradation levels are relatively small, is smaller than the number of circumscribing pixels in the surrounding of the image, the image is determined to be an underexposed image.

12 Claims, 17 Drawing Sheets

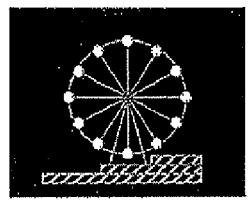 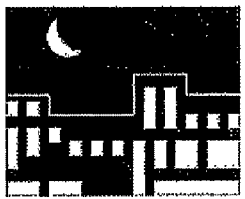 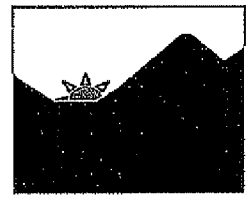 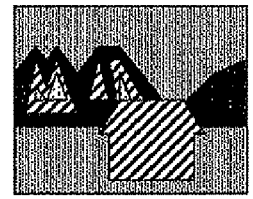
(a) LOW-KEY IMAGE (NIGHT SCENE 1)  (b) LOW-KEY IMAGE (NIGHT SCENE 2)  (c) LOW-KEY IMAGE (EVENING SCENE)  (d) UNDER IMAGE (UNDER-EXPOSED)
F I G. 1

· LOW LEVEL IMAGE (SOLID PARTS)

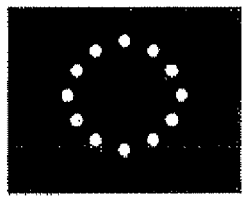 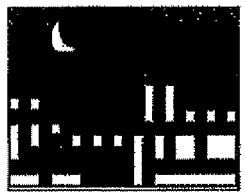  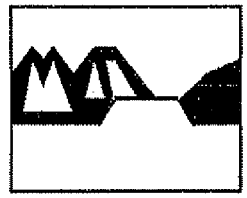

(a) LOW-KEY IMAGE (NIGHT SCENE 1)　　(b) LOW-KEY IMAGE (NIGHT SCENE 2)　　(c) LOW-KEY IMAGE (EVENING SCENE)　　(d) UNDER IMAGE (UNDER-EXPOSED)

EXTRACT CIRCUMSCRIBING PIXELS

· RECTANGULAR CIRCUMSCRIBING PIXELS (BOLD LINE PARTS)

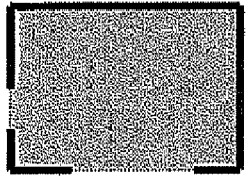 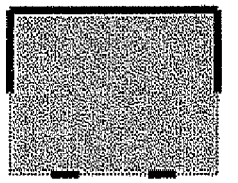 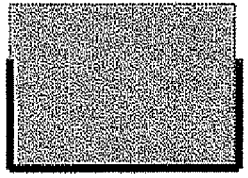 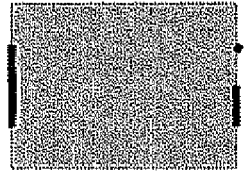

(e) LARGE NUMBER OF CIRCUMSCRIBING PIXELS → JUDGED AS LOW-KEY IMAGE　　(f) LARGE NUMBER OF CIRCUMSCRIBING PIXELS → JUDGED AS LOW-KEY IMAGE　　(g) LARGE NUMBER OF CIRCUMSCRIBING PIXELS → JUDGED AS LOW-KEY IMAGE　　(h) SMALL NUMBER OF CIRCUMSCRIBING PIXELS → JUDGED AS UNDER IMAGE

FIG. 2

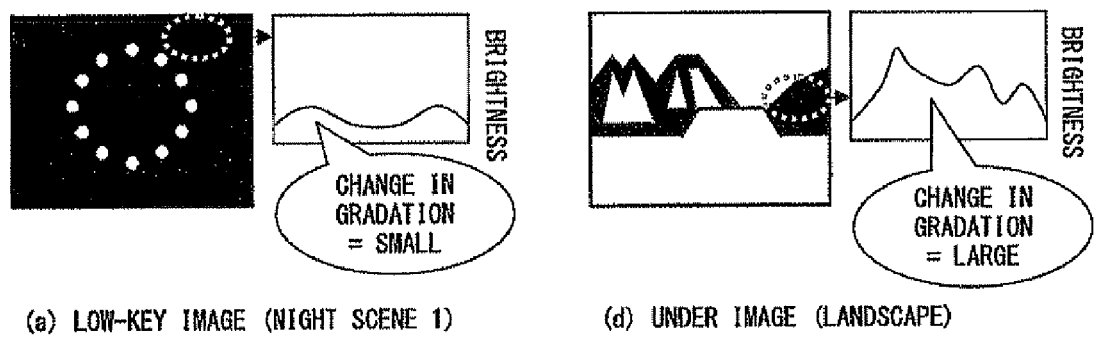
F I G. 3

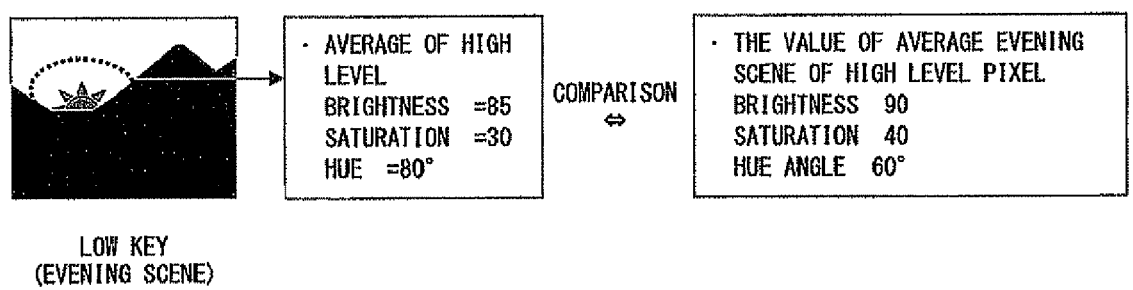
F I G. 5

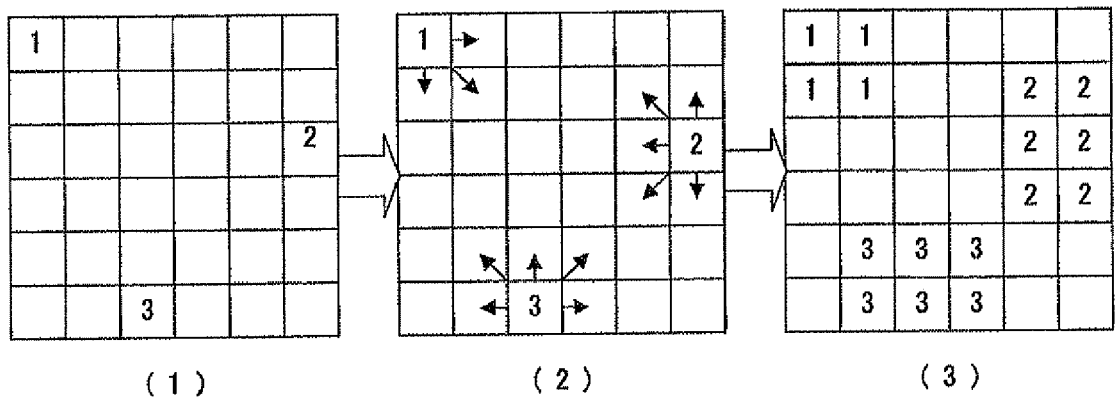
F I G. 7

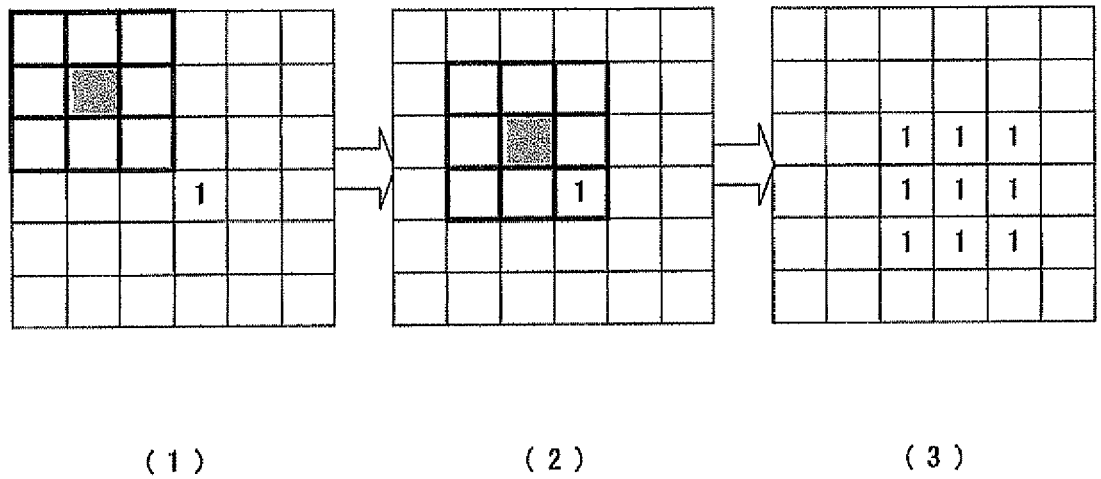
(1) (2) (3)
F I G. 8

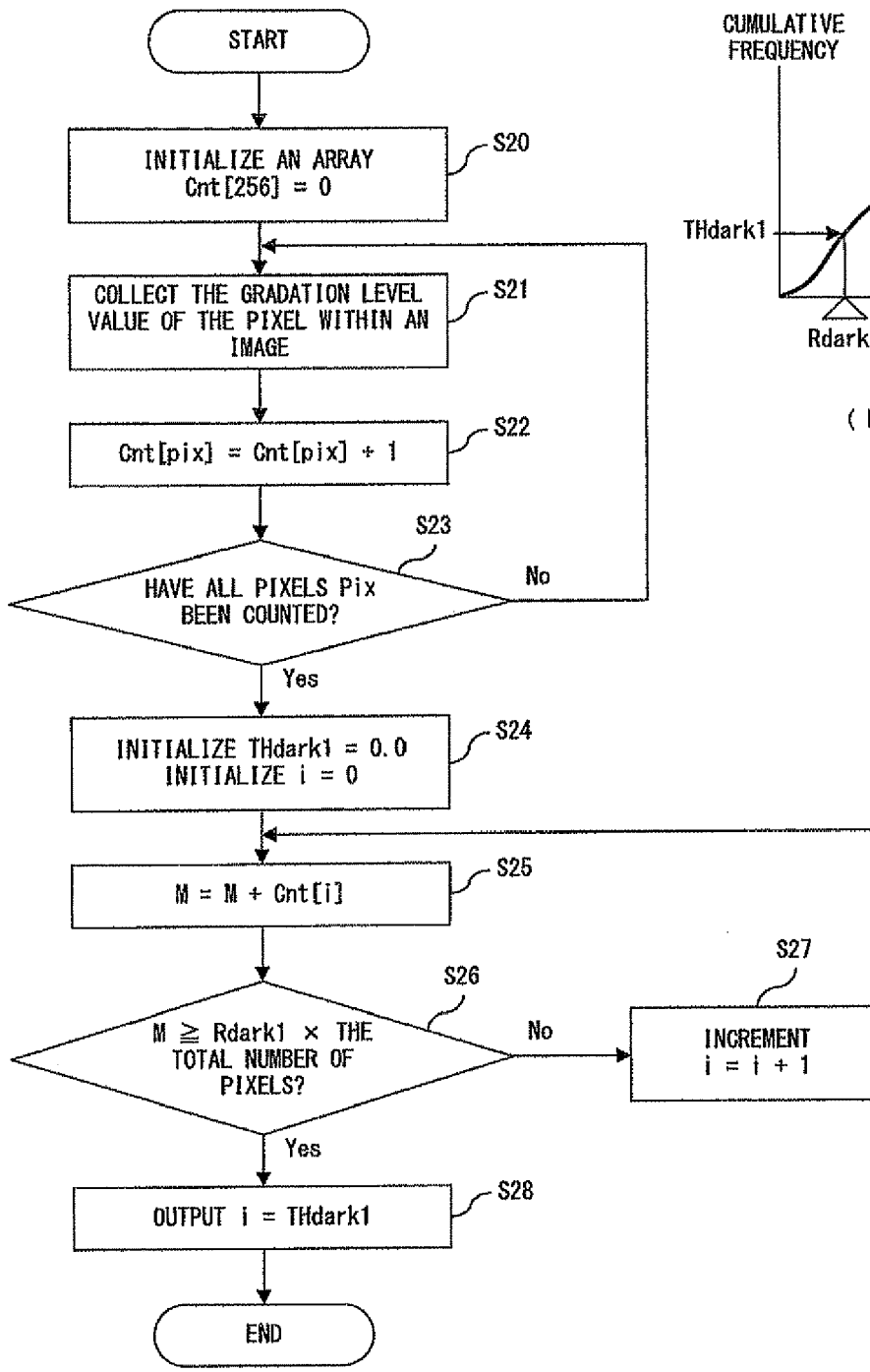
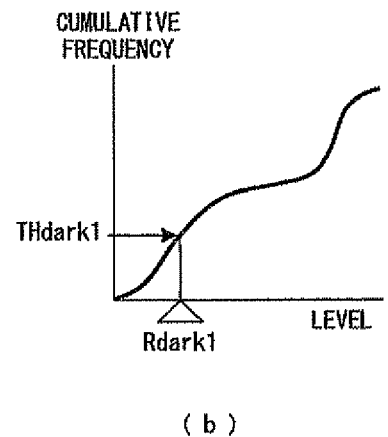
FIG. 10

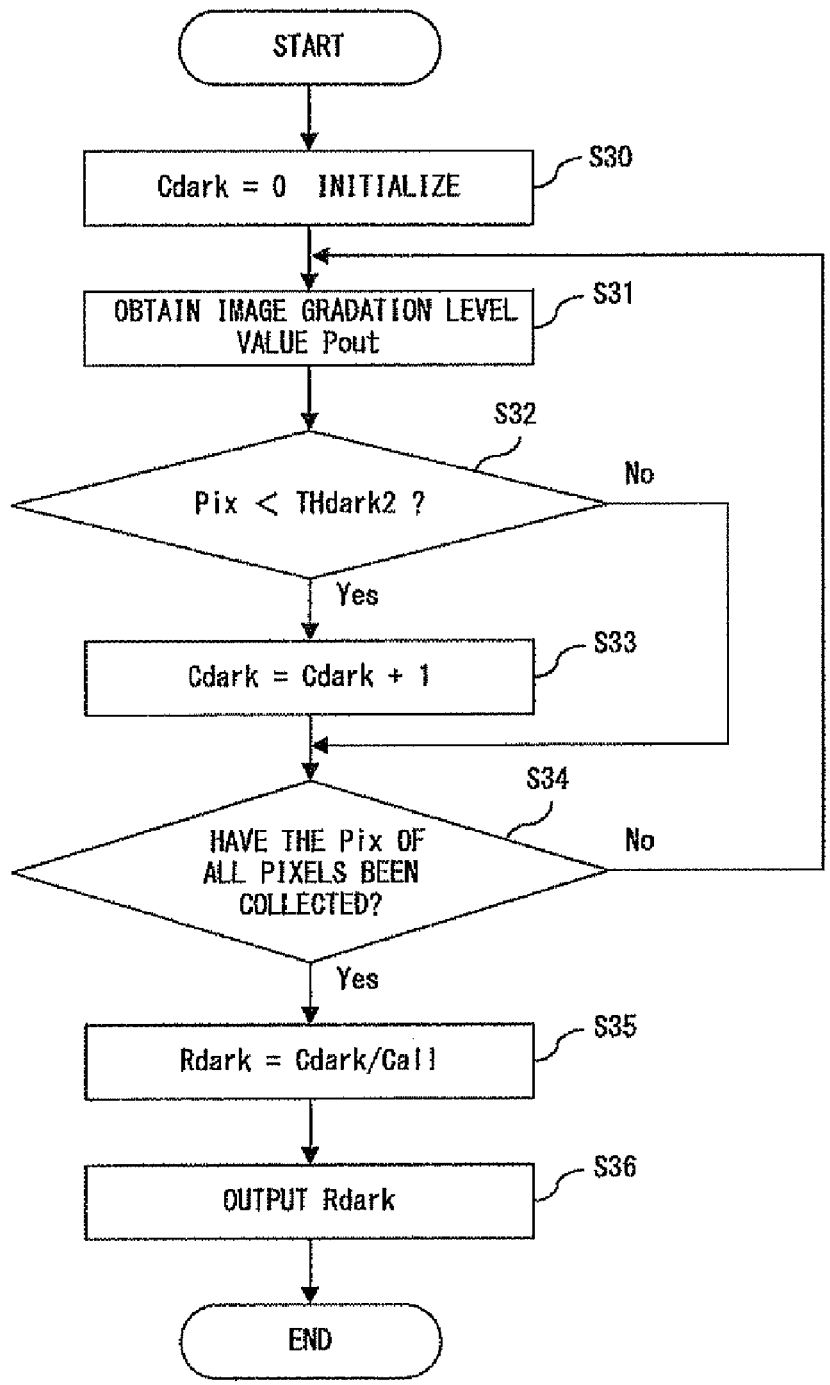
F I G. 1 1

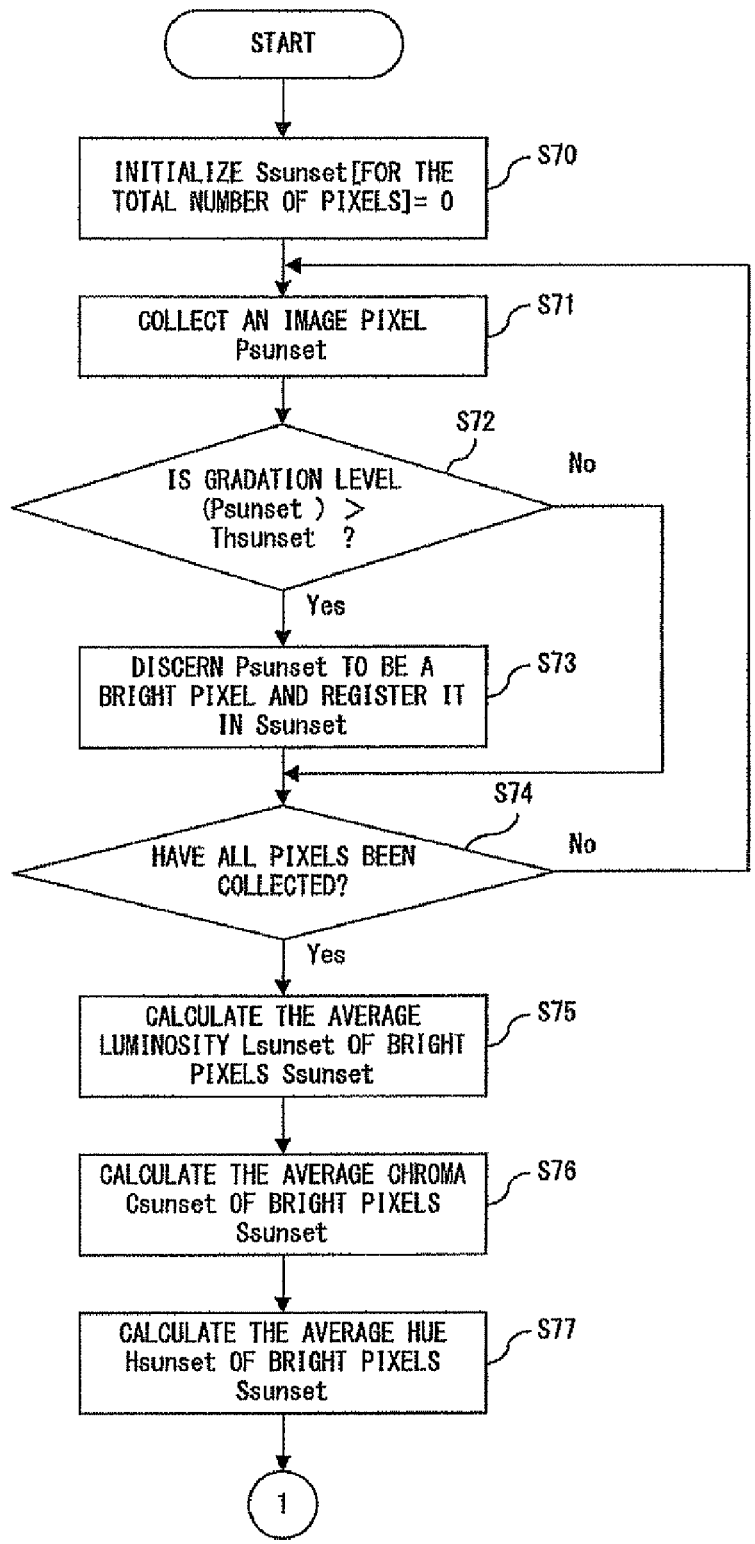
F I G. 16

US 8,391,633 B2

IMAGE DISCERNMENT APPARATUS

CROSS-REFERENCE TO THE RELATED APPLICATION

This application is a continuation application of an international patent application No. PCT/JP2005/023338, filed on Dec. 20, 2005.

BACKGROUND OF THE INVENTION

1. Field of the Invention

The present invention relates to an image processing apparatus performing an image quality improvement process automatically without a user requesting image correction, and in particular, to an image discernment apparatus for automatically discerning the brightness of an image.

2. Description of the Related Arts

In keeping pace with the popularization of image input devices such as digital cameras and image scanners in recent years, the chances of utilizing information processing apparatuses especially for displaying and printing an image on a computer display have been on the increase.

Input images include various images in different conditions such as an excessively dark image and an excessively bright image in addition to an adequately bright image. A brightness correction technique has been devised for analyzing the brightness of those input images and correcting them to an appropriate level of brightness.

FIG. 1 is a diagram describing the kinds of dark images.

Here, generally dark images related to an image as a processing target are categorized into: images determined to be too dark because the gradation is in a dark tone, and images determined to be not too dark although the gradation is in a dark tone. The former corresponds to a backlit image in which the primary object is obscured but yet the background part is bright and to an image in which the entire image is clearly underexposure due to the photographic condition of a digital camera. These are generally categorized as underexposed images (abbreviated as "under images" hereinafter). FIG. 1(d) exemplifies an under image that has been underexposed. The latter corresponds to a night scene image that has photographed a game center or city street at night and also to an evening scene image that has been photographed at twilight. These are generally categorized as low-key images. FIGS. 1(a) and (b) exemplify images of a night scene floating in the dark, FIG. 1(c) exemplifies a low-key image of an evening scene in twilight and FIG. 1(d) exemplifies an under image of the night scene of a street.

In the conventional brightness correction technique, the method is devised for discerning a dark image, whether it is an under image, of which the gradation is in dark tone and therefore determined to be too dark, or a low-key image, which is in dark tone but yet is not too dark, and correcting the brightness appropriately.

Reference patent document 1 has disclosed the technique for dividing an image into two zones, i.e., the center zone and the peripheral zone, by judging whether or not a number of dark level pixels are distributed in the entirety of the image. Then, if a large number thereof are determined to be distributed, judging whether or not the dark level pixels are distributed in the peripheral zone rather than in the center zone, and, if the judgment is as such, judging the image as a low-key image such as a night scene.

The technique according to the patent document 1 contains the problem in which an image is discerned as a low-key image if a large number of dark images exist in the peripheral zone of the image, but becomes difficult to discern if a large number of dark images do not exist in the peripheral zone. Other problems are computer calculation cost and slow processing speeds for large size data with a large number of pixels due to a thorough search of the pixels in the center and peripheral zones followed by the calculation of statistical information of those pixels necessary for judgment.

Meanwhile, reference patent documents 2, 3, and 4 also adopt the method for predetermining an image to be either the center zone or peripheral zone, comparing the pixel information between the center and peripheral zones and judging the image to be, for example, a night scene, backlit, etc., and accordingly contain the problem similar to the technique according to the patent document 1.

Patent document 1: Laid-Open Japanese Patent Application Publication No. 2002-247361
Patent document 2: Laid-Open Japanese Patent Application Publication No. 2004-341901
Patent document 3: Laid-Open Japanese Patent Application Publication No. 2003-169231
Patent document 4: Laid-Open Japanese Patent Application Publication No. 2003-337944

SUMMARY OF THE INVENTION

The purpose of the present invention is to provide an image discernment apparatus enabling both the discernment of a low-key image and of an underexposed image accurately even for an image in which a number of dark pixels do not exist in the peripheral zone thereof and to provide a high speed process while reducing the calculation cost.

According to the present invention, an image discernment apparatus comprises a count unit for counting the number of pixels, of which the gradation levels are smaller than a predefined first threshold value, among pixels positioned in the periphery of the image; and a discernment unit for discerning an image to be of an appropriate gradation even though the image is in a dark tone if the number of pixels, as a result of the counting, is not less than a predefined second threshold value.

BRIEF DESCRIPTION OF DRAWINGS

FIG. 1 is a diagram describing the kinds of dark images;

FIG. 2 is a diagram describing the process steps of a preferred embodiment;

FIG. 3 is a diagram describing an image discernment method utilizing a change in gradation;

FIG. 5 is a diagram describing the method for judging an evening glow image;

FIG. 7 is a diagram describing a zone expansion process;

FIG. 8 is a diagram describing a window search process;

FIG. 10 is a flow chart of the process according to a preferred embodiment of the present invention (part 2);

FIG. 11 is a flow chart of the process according to a preferred embodiment of the present invention (part 3);

FIG. 16 is a flow chart of the process according to a preferred embodiment of the present invention (part 8)

DESCRIPTION OF THE PREFERRED EMBODIMENTS

Figure 4:
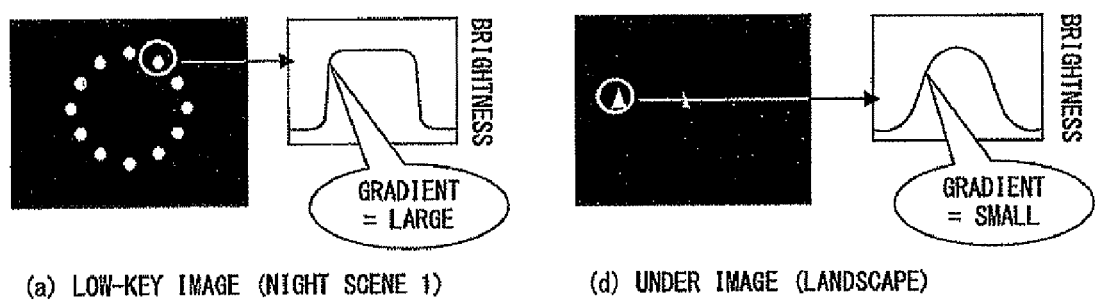
FIG. 4 is a diagram describing the method for judging whether or not an image is a night scene image from both the change in gradation and the gradient of gradation between a bright pixel and the surrounding pixels.

A low-key image has dark tones in the entire image and a dark pixel zone with a certain size exists in the image. In most cases, such dark zone pixels circumscribe an image rectangle, the positions thereof are not constant, and many of them are characterized as being distributed not only in the peripheral part of an image but also across therefrom to the center zone.

As for an underexposed image (abbreviated as "under image" hereinafter), while it has a dark tone in the entire image, it can be changed to an appropriate image with an appropriate brightness and plenty of gradation if it is converted into a brighter image. Therefore, pixels with various brightness levels are distributed in a mixture, such as including some slightly brighter pixels rather than being limited to dark pixels, within an image rectangle (i.e., a zone in which an image is displayed). Here, the image rectangle means the form of image data inputted from a digital camera, an image scanner, or such. The rectangle indicates the entirety of a data image that is primary-scanned in the horizontal direction and secondary-scanned in the vertical direction. The data image is usually a rectangle, such as an (oblong) rectangle or a square.

Further, when it is discerned as to whether or not the gradation is appropriate in an image that is entirely dark in tone, a preferred embodiment of the present invention is configured to perform the step of discerning it as an image having a dark tone but yet having an appropriate gradation if the quantity of pixels with low levels is large, or if the quantity of pixels with low levels is small, discerning it as an image having an inappropriate gradation judged on the basis of the quantity of pixels having low gradation levels and which altogether circumscribe an image rectangle.

FIG. 2 is a diagram describing the process steps of the aforementioned embodiment.

FIGS. 2($a$) through 2($d$) represent various kinds of dark images: FIGS. 2($a$) and 2($b$) are night scenes, FIG. 2($c$) is a low-key image of an evening scene, and FIG. 2($d$) is an underexposed under image. The above described process is applied to these images, all of the levels of the luminosity, chroma, and hue (or only the level of luminosity) of the circumscribing pixels are examined, and it is determined how many circumscribing pixels exist adhering to levels no greater than a predefined value. Then, the image is determined to be a low-key image either if the quantity of circumscribing pixels, of which the level is no greater than the predefined value, is absolutely no less than a predetermined value or if the quantity is relatively large as compared to the number of the circumscribing pixels of the image rectangle, while the image is judged as an under image if the quantity of such circumscribing pixels is absolutely less than the predefined value or relatively less than the total number of circumscribing pixels. As an example, FIG. 2($e$) shows, from the bold lines, pixels of which the aforementioned level is no more than a predefined value among the circumscribing pixels shown in FIG. 2($a$). In the case of FIG. 2($e$), the number of pixels of which the aforementioned level is no more than a predefined value is relatively large compared to the total number of circumscribing pixels, and therefore the image is judged as a low-key image. FIG. 2($f$) indicates how the circumscribing pixels of FIG. 2($b$) are distributed (and FIGS. 2($g$) and 2($c$), and FIGS. 2($h$) and 2($d$) likewise correspond to each other), with the bold lines indicating the pixels of which the aforementioned level is less than a predefined value. In the cases of FIGS. 2($f$) and 2($g$), the number of circumscribing pixels, of which the aforementioned levels are no more than the predefined value, is relatively large, and therefore FIGS. 2($b$) and 2($c$) are determined to be low-key images. In contrast, the number of circumscribing pixels, of which the aforementioned levels are no more than the predefined value, is relatively small in the case of FIG. 2($h$), and therefore FIG. 2($d$) is determined to be an under image.

The above described method makes it possible to discern highly accurately both a low-key image, in which the image is in a dark tone and yet in which the gradation is appropriate, and an under image, in which the image is in a dark tone and the gradation is inappropriate. The method also counts the number of pixels only at the outer circumference of the rectangle of an input image, thereby making it possible to reduce the calculation cost and carry out the process at a higher speed as compared to the conventional technique.

Meanwhile, when making a judgment by using the information of the pixels circumscribing an image rectangle (i.e., the zone in which an image is displayed), if a large number of bright images are distributed in the area immediately inward from the circumscribing pixels of the image rectangle, there is a possibility of making an erroneous judgment. In order to make a highly accurate judgment in such a case, a preferred embodiment of the present invention is configured to further carry out the process on the basis of the ratio of low-level pixels to all of the pixels of an image, of discerning an image to be one in which the image is dark in tone but yet the gradation is appropriate if the ratio is high, while discerning an image to be one in which the image is in a dark tone but yet the gradation is inappropriate if the ratio is low.

The above described configuration makes it possible to discern an image highly accurately even though the image tends to cause an erroneous judgment when there are bright pixels immediately inward from the circumscription of the image.

Meanwhile, a dark pixel zone circumscribing an image rectangle may sometimes be placed as a continuous background image in the center vicinity of the image in lieu of being limited to the periphery thereof. Accordingly, the configuration carries out the process for extracting a surrounding pixel zone in which the gradation of pixels is continuous with the low-level pixels circumscribing the image rectangle, and for collecting a change in gradation among the pixels in the inside of the obtained pixel zone, followed by discerning an image to be the one in which the image has a dark tone but yet the gradation is appropriate if the change in gradation is small, and for discerning the image to be the one in which the image has a dark tone and the gradation is inappropriate if the change in gradation is large.

FIG. 3 is a diagram describing an image discernment method utilizing a change in gradation.

FIG. 3($a$) shows the case in which a change in gradation is determined to be small as a result of examining the change in gradation of the dark zone circumscribing the image rectangle. This case is judged as a low-key image. FIG. 3($b$) shows the case in which a change in gradation of the dark zone circumscribing the image rectangle is large. The image in this case is judged as an under image.

The configuration described above makes it possible to detect a part estimated as an image background from a low level pixel zone, recognize the difference in characteristics between the low-key image and under image, and discern each highly accurately.

Meanwhile, in a night scene image used as one of the low-key images, the entire image has a dark tone but yet a plurality of bright pixel zones lit by lamps, neon signs, and such are placed at the inside of the image. The surroundings of these bright pixel zones are adjacent to the dark pixel zone of the background image, and the change in brightness from the bright pixel zone to dark pixel zone is drastic. This is because the light source of a luminous body is placed in a pitch dark background image. Therefore, a configuration comprises both the process of extracting a pixel zone in which the pixel value level is high and the process of calculating the change in gradation between a pixel zone and the surrounding pixel zone by collecting the spatial distribution of the pixel value level of the surrounding pixel of the obtained pixel zone, and discerns an image to be a night scene image in which the image is in a dark tone but yet the gradation is appropriate if the gradient of the gradation is large, while it discerns the image to be not a night scene image in which the image is in a dark tone but yet the gradation is appropriate.

FIG. 4 is a diagram describing the method for judging whether or not an image is a night scene image from both the change in gradation and the gradient of gradation between a bright pixel and the surrounding pixels.

FIG. 4(a) shows the gradient of gradations between a bright pixel and the surrounding pixel to be large, which is judged as a night scene image and a low-key image in which the image may be dark. FIG. 4(b) shows the gradient of gradations between a bright pixel and the surrounding pixel being small, which is judged as not a night scene image and an under image which should have primarily been a bright pixel.

Further, in an evening scene image, while the entire image is in a dark tone, pixels having values similar to the hue, luminosity and chroma of an average evening glow are distributed in the bright pixel zone of the image. Therefore, a configuration comprises the processes of extracting a pixel zone in which the pixel level is high, calculating the average level in the inside of the obtained pixel zone and comparing it with either one of the hue, chroma, and luminosity, or all of them, of the average evening glow, and, if these match one another, the image is determined to be an evening glow image in which the image is in a dark tone but yet the gradation is appropriate, while if these do not match one another, the image is determined not to be an evening glow image in which the image is in a dark tone but yet the gradation is appropriate.

FIG. 5 is a diagram describing the method for judging an evening glow image.

A sunset is taken in FIG. 5(a). When judging whether or not it is an evening glow image, a bright zone within the image is extracted, and the pixel value level of the aforementioned zone is compared with that of the average evening scene for either the luminosity, chroma, or hue, or all of them. Then, if the elements are similar, the image is judged to be an evening scene image that is a low-key image in which the image per se may be dark.

The configuration described above makes it possible to further accurately discern a night scene image and an evening glow image from a low-key image.

The method described above that both accurately discerns a low-key image from an under image and, further, a night scene from an evening scene image enables an implementation of a highly accurate automatic technique that improves image quality, such as converting a night scene into a preferred image quality by enhancing the contrast in the case of a night scene and converting an evening scene into a preferred image quality by enhancing the chroma of a hue specific to an evening scene in the case thereof when carrying out a brightness correction, while preventing a low-key image, in which the image has a dark tone but yet the gradation is appropriate, from erroneously correcting to a bright image and preventing an under image, in which the image has a dark tone and the gradation is inappropriate, from being erroneously left unchanged as a dark image.

Figure 6:
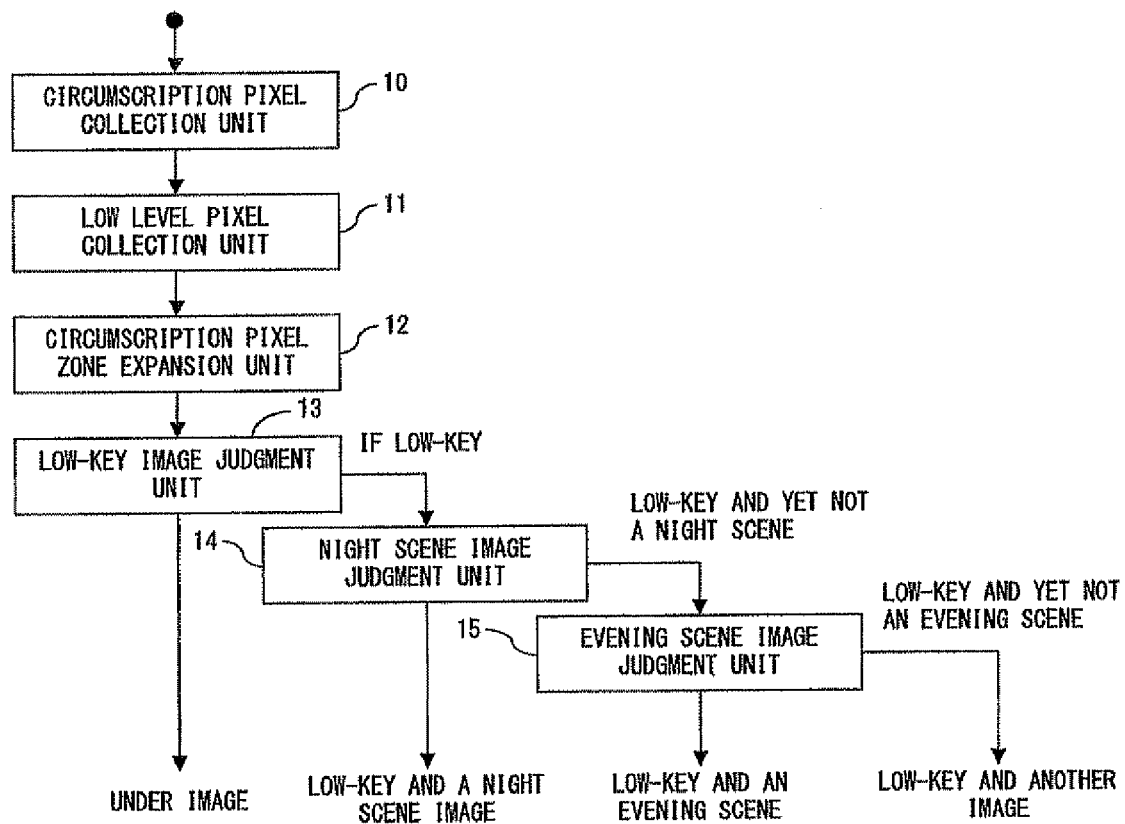
FIG. 6 is a block diagram of an image discernment apparatus according to a preferred embodiment of the present invention.
Figure 9:
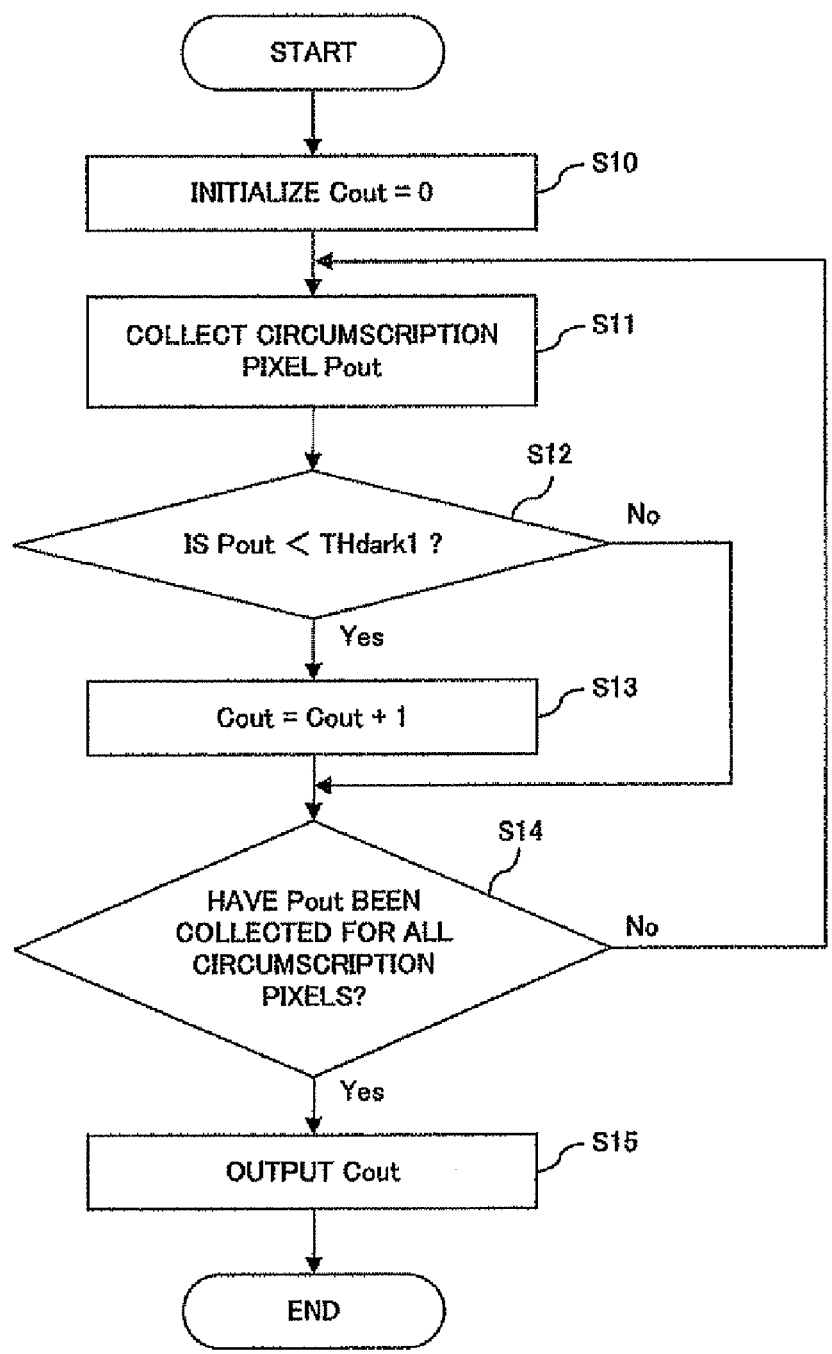
FIG. 9 is a flow chart of the process according to a preferred embodiment of the present invention (part 1)

FIG. 6 is a block diagram of an image discernment apparatus according to a preferred embodiment of the present invention.

A circumscription pixel collection unit 10 collects circumscription pixels from an input image. A low-level pixel collection unit 11 collects pixels of which the pixel gradation level is low from among the circumscription pixels. A circumscription pixel zone expansion unit 12 performs the process for obtaining the same pixel zone as the zone including the circumscription pixels. For example, if the circumscription pixels are applicable to a mountain part, the zone in which a mountain is in the picture is extracted from the image. A low-key image judgment unit 13 determines whether an image is a low-key image or an under image by means of the method shown in FIGS. 2 and 3. A night scene image judgment unit 14 discerns an image to be a low-key image and also a night scene image by means of the method shown in FIG. 4. An evening scene image judgment unit 15 discerns an image to be a low-key image and also an evening scene image. The image determined not to be an evening scene image is a low-key image.

Next is a description of each unit.

First, an image is input to the circumscription pixel collection unit 10. The circumscription pixel collection unit 10 searches for the gradation level value, Pout, of the circumscription pixels, which is in contact with the edge of an input image rectangle, and the unit compares Pout with a predetermined threshold value THdark1. If the gradation level value Pout is less than the threshold value THdark1, the pixel is discerned as a dark pixel, while if the gradation level value Pout is no less than the threshold value THdark1, the pixel is discerned as a bright pixel followed by the number of pixels discerned as dark pixels being counted as Cout. Here, since the gradation level value is used for examining the brightness of a pixel, it is a luminosity value; a similar process may be applied to the chroma and hue. Further, if a pixel value is expressed by an RGB value, a configuration may be so as to judge whether or not the R, G, and B values are no less than predefined threshold values, respectively. A similar process applies to a gradation level.

Here, a predetermined threshold value THdark1 may adopt a pixel value that is discerned as a sufficiently dark level value as a fixed value. If a gradation range is different for each input image, an alternative method may be configured to collect the cumulative frequency distribution of gradation level values for each of the input images, to search the lower level value side for pixels equivalent to the number of pixels of a ratio, Rdark1, relative to the total number of pixels of an image by using the ratio, Rdark1, that is predetermined, and to calculate a gradation level value of which the number of pixels collected from the lower level is equivalent to the ratio, Rdark1, of the total number of pixels, thereby adopting the threshold value, THdark1.

As an example, when a threshold value, THdark1, is set as a fixed value for the pixels of a 256-gradation, a THdark1=10 is adopted, or when it is dynamically determined for a gradation range that is different for each image, pixels equivalent to 1% from the lower level of the image are collected by setting the ratio Rdark1=0.01 (i.e., 1%), and pixels are collected by setting the maximum gradation level value of the collected pixels as, for example, THdark1=20. From the above described method, the number of pixels, Cout, discerned as dark pixels is calculated and determined.

Subsequently, the image is input to the low level pixel collection unit 11 that then searches the entire pixels of the input image, discerns the pixel as a dark pixel if the gradation level value is less than a threshold value, THdark2, by using the predetermined threshold value, THdark2, while discerning the pixel as a bright pixel if it is no less than the threshold value, THdark2, and counts the number of pixels determined as dark pixels, thereby determining the number to be Cdark.

Here, the predetermined threshold value, THdark2, may adopt, as a fixed value, a pixel value which will be discerned as a sufficiently dark level value. If a gradation range is different for each input image, an alternative method may be configured to collect the cumulative frequency distribution of gradation level values for each of the input images, to search the lower level value side for pixels equivalent to the number of pixels of a ratio, Rdark2, relative to the total number of pixels of an image by using the predetermined ratio, Rdark2, and to adopt a collected maximum gradation level value as the threshold value, THdark2, when collecting the pixels, starting from the lower level until a pixel to which the number of the pixels is the ratio, Rdark2, of the total number of pixels.

As an example, when a threshold value, THdark2, is set as a fixed value for the pixels of a 256-gradation (here, the description is provided by assuming only one gradation value; there are actually R values, G values, and B values, however, that are respectively processed. Alternatively, the process may be carried out after converting the RGB value into a luminosity value), a THdark2=60 is adopted, or when it is dynamically determined for a gradation range that is different for each image, pixels equivalent to 30% from the lower level of the image are collected by setting the ratio Rdark2=0.3 (i.e., 30%), and pixels are collected by setting the maximum gradation level value of the collected pixels to, for example, THdark2=40.

In this event, the ratio, Rdark (=Cdark/Call), of a Cdark to the total number of pixels is calculated and determined by using the obtained number of pixels, Cdark, and the total number of pixels, Call, of the input image.

Subsequently, the image is input to the circumscription pixel zone expansion unit 12. A zone expansion is carried out on the basis of the circumscription pixel, Pout, searched by the circumscription pixel collection unit 10 at the previous stage. The zone expansion represents a common labeling process that performs the operations of putting an area number label on a focus pixel as a start pixel, searching the surrounding pixels of the start pixel, regarding the start pixel and the presently focused surrounding pixel to be in the same area if the color difference from the start pixel is within a predetermined color difference, DIFFreg, and giving a label of the same area number as that of the start pixel. The search is repeated with the surrounding pixel that is given the new label by making it the start pixel again, and the process is repeated until there are no remaining pixels to give labels.

FIG. 7 is a diagram describing a zone expansion process.

First, pixels are selected from the circumscription pixels as shown in FIG. 7 (1) as a basis (noted as "base pixels" hereinafter) for a zone expansion in which the pixels labeled as "1", "2", and "3" are the base pixels for the zone expansion. Then, the difference between the gradation value of a labeled pixel and that of a pixel adjacent to the pixels labeled "1", "2", and "3" are calculated, and, if the calculated value is no more than a threshold value, the labeled pixel and the adjacent pixel are provided with the same label as they are determined to be pixels belonging to the same zone as shown in FIG. 7 (2). For example, if the difference between the gradation value of the pixel "1" and that of the adjacent pixel is no more than a threshold value, a label "1" is given to the adjacent pixel as shown in FIG. 7 (3). Likewise, if the difference of the gradation values is no more than a threshold value, a label "2" is given to the adjacent pixel of the pixel "2", and a label "3" is given to the adjacent pixel of the pixel "3". As such, the zone expansion is carried out with the circumscription pixel of an image rectangle set as a start pixel, a pixel zone regarded as continued from the circumscription pixel is collected, and the pixel of the obtained expansion zone is defined as Sreg. Then, a pixel included in the expansion zone is re-set as a start pixel, a similar process is carried out, and the process is repeated until the expansion process can no longer be continued.

Furthermore, pixels applicable to the Sreg zone are traversed for the obtained Sreg, and the standard deviation, STDEVreg, of the pixels within the Sreg is calculated. The standard deviation, STDEVreg, represents the change-amount of the pixel gradation values within the expanded zone, with the value increasing with the variation of the gradations and the value decreasing with the change-amount of gradation values being minimized. As such, the gradation change amount, STDEVreg, of the continuous pixel zone of the circumscription pixels of the image rectangle is calculated and determined.

Subsequently, three pieces of information, i.e., the Cout obtained at the above described circumscription pixel collection unit 10, the Rdark obtained at the low level pixel collection unit 11, and the STDEVreg obtained at the circumscription pixel zone expansion unit 12 are input to the low-key image judgment unit 13.

If the Cout is no less than a THjudge1, the Rdark is no less than a THjudge2, and also the STDEVreg is less than a THjudge 3, the image is discerned as a low-key image. Otherwise, it is discerned as an under image.

As the Cout increases, either the number of pixels circumscribing the image rectangle increases or the number of pixels applicable to a pitch dark zone, which is specific to a low-key image, increases, thus meaning there is a possibility that the image is a low-key image.

Meanwhile, as the value of Rdark increases, the input image is darker; if an image is such that a large number of bright pixels exists in the immediate inside of the circumscription part of the image, thus making the present value smaller, the possibility of the image being either a low-key image or under image is low.

Further, as the value of the STDEVreg increases, there is an increasing possibility that the image is the one in which the gradation is fundamentally appropriate, but yet the image is underexposed since there is a change in gradation in a pitch dark zone continuous from the pixels circumscribing a rectangle. If the value of the STDEVreg is low, the change in gradation is small, indicating, for example, an image of a pitch dark zone of a night scene in the background with fundamentally low gradation, thus meaning there is a high possibility of the image being a low-key image.

Subsequently, an image judged to be a low-key image is input to the night scene image judgment unit 14. The night scene image judgment unit 14 searches for the pixel, Pnight, of the input image and classifies the pixel as either a bright pixel if the gradation level value is no less than a predetermined threshold value, THbright, by using the value, THbright, as a dark pixel if the gradation level value is less than the value, THbright, then searches for a pixel zone discerned as the bright pixel and determines it to be Sbright.

Here, the predetermined threshold value, THbright, may adopt a fixed pixel value that will be discerned to be a sufficiently bright level value. If a gradation range is different for each input image, an alternative method may be configured to collect the cumulative frequency distribution of gradation level values for each of the input images, to collect pixels that are equivalent to the number of pixels of a ratio, Rbright, relative to the total number of pixels of an image by searching the lower level value side by using the predetermined ratio, Rbright, and to adopt, as the threshold value, THdark1, the lowest gradation level value from among the collected pixels when the number of pixels collected from the upper level becomes the ratio, Rbright, of the total number of pixels.

As an example, the threshold value, THbright, is set at a fixed value, THbright=245, for the pixels of a 256-gradation, or when the value is dynamically determined for a gradation range that is different for each image, pixels equivalent to 1% from the upper level of the image are collected by setting the ratio, Rbright=0.01 (i.e., 1%), and pixels are collected by setting the lowest gradation level value of the collected pixels as, for example, THbright=250. From the above method, a pixel zone, Sbright, discerned as containing bright pixels is calculated and determined.

Subsequently, the surrounding pixels in the pixel zone of the obtained Sbright are searched for, and the surrounding pixel zones, Sround, are determined.

The surrounding pixel zone, Sround, may be generated by applying an expansion process to the pixel zone, Sbright, by using a predetermined number of pixels, W. It may alternatively be determined by applying a window search process by size W×W pixels predetermined in the image.

FIG. 8 is a diagram describing a window search process.

The process of FIG. 8 uses a 3×3 window. The window is moved on the pixel zone, and, as shown in FIG. 8 (1) and (2), it is determined whether or not there is a bright pixel Sbright in the center of the window. The Sbright is represented by the pixel of the label "1" in FIG. 8 (1) and (2). Then, when the Sbright arrives at the center of the window as shown in FIG. 8 (3), other pixels included in the window are the surrounding pixel zone Sround of the Sbright, and therefore the same label as the Sbright, "1", is attached and registered as Sround. This makes it possible to identify the pixels within the pixel zone that are the surrounding pixels of particular Sbrights.

W is an integer of no less than "1". If a focus pixel is no less than an Sbright as a result of searching for the pixel of an image, that which is other than the target pixel of the Sbright among pixels within a W×W-size window is adopted as an Sround.

Such a window process is applied in all pixels to determine an Sbright zone.

For example, in the case of an expansion process or window process, a numeral such as W=3 is adopted. This calculates and determines the surrounding pixel zone Sround of a bright pixel zone.

Incidentally, FIG. 8 shows an Sbright as a single pixel. Actually however, a bright part within a pixel zone is usually constituted by a plurality of pixels, and therefore the Sbright is a zone constituted by a plurality of bright pixels.

Subsequently, the process searches for a change in gradation of the Sbright pixel zone and Sround pixel zone, and the gradient SL of gradations is calculated.

The pixel average level value, AVEbright, of an Sbright zone is calculated, the pixel average level value, AVEround, of an Sround is calculated, and then the gradient SL of gradations is calculated by using the following expression:

$$SL=|AVEbright-AVEround|/W$$

Here, while the AVEround is defined as the pixel average level of the Sround, an Sbright is adjacent to the Sround. The gradient SL may be acquired by calculating a pixel average level value AVEround+bright by using an Sround+bright as the sum of Sround and Sbright. In this case, the calculation expression is as follows:

$$Sround+bright=Sround+Sbright$$

$$SL=|AVEbright-AVEround+bright|/W$$

Subsequently, the input image is judged as a night scene image by using a predetermined threshold value, THslope, if the gradient SL of the gradations is no less than the THslope. If it is less than the THslope, the image is determined not to be a night scene image.

As the value of THslope increases, the brightness in an area spanning from a bright image zone Sbright to the Sround of the surrounding pixels changes drastically, showing how the pitch dark background images are distributed around the light emitting bodies and light source, such as street lights and neon signs that are specific to a night scene. In contrast, as the value of THslope decreases, the change in brightness is no longer drastic, and instead, it demonstrates a gradual change in gradation, showing the distribution of gradations representing an image in which a street light or neon sign does not exist.

In a comparison of the case of using the Sround and that of using the Sround+bright in the calculation of the gradient SL, the latter case goes under the influence of the bright Sbright zone. The characteristics of the gradient increasing in a night scene image and of the gradient decreasing in images other than the night scene, however, apply to both of the cases of using the Sround and using the Sround+bright. Therefore, a calculation of the gradient SL may use either an Sround or an Sround+bright.

As an example, a value such as a threshold value THslope=200 is adopted for a 256-gradation image. With this method, the input image is discerned, and there is a determination as to whether it is either low key and a night scene or a low key but yet not a night scene.

Subsequently, the image discerned as low-key image but yet not a night scene image is input to the evening scene image judgment unit 15 that then searches for the pixels, Psunset, of the input image. It then discerns, by using a predetermined threshold value, THsunset, the pixel to be a bright pixel if the gradation level value is no less than the THsunset, discerns it to be a dark pixel if the gradation level value is less than the THsunset, and searches for, and collects, the pixel zone discerned to contain bright pixels in order to define it as an Ssunset.

Here, the predetermined threshold value, THsunset, may adopt a fixed pixel value that will be discerned to be a sufficiently bright level value. If a gradation range is different for each input image, an alternative method may be configured to collect the cumulative frequency distribution of gradation level values for each of the input images, to collect pixels equivalent to the number of pixels of a ratio, Rsunset, relative to the total number of pixels of an image by searching the lower level value side by using the predetermined ratio, Rsunset, and to adopt, as the threshold value, THsunset, the lowest gradation level value from among the collected pixels when the number of pixels collected from the upper level becomes the ratio, Rsunset, of the total number of pixels.

As an example, when a threshold value, THsunset, is set as a fixed value for the pixel of a 256-gradation, a THsunset=200 is adopted, or when it is dynamically determined for a gradation range that is different for each image, pixels equivalent to 30% from the upper level of the image are collected by setting the ratio Rsunset=0.3 (i.e., 30%), and pixels are collected by setting the lowest gradation level value of the collected pixels to, for example, THsunset=210. From the above method, a pixel zone, Ssunset, discerned as bright pixels are calculated and determined.

Subsequently, the average luminosity, Lsunset, average chroma, Csunset, and average hue angle, Hsunset, are calculated for the zone pixels of the Ssunset.

In this event, comparing the average luminosity, Lsunset, average chroma, Csunset, and average hue angle, Hsunset with the luminosity, Lref, chroma, Cref, hue angle, Href, respectively, of the average/common evening glow the color difference, DIFFsunset is calculated. For example, the following expression is used to calculate the color difference DIFFsunset:

$$DIFFsunset = a|Lsunset - Lref| +$$
$$b|Csunset - Cref| +$$
$$c|Hsunset - Href|;$$

where a, b, and c are weighting factors for determining which of the luminosity, chroma, and hue angle, respectively, is to be emphasized.

For example, a=b=c=1, and Lref=220, Cref=30, and Href=60° (i.e., the hue parts of red through yellow with orange at the center) are adopted as the reference value of the bright pixel zone of a common, average evening scene.

Then, for the color difference, DIFFsunset, the image is discerned, by using a predetermined threshold value, THdiffsunset, as a low-key and an evening scene image if the color difference is less than the threshold value, THdiffsunset. It is discerned as a low-key but yet not an evening scene image if the color difference is no less than the THdiffsunset.

For example, a threshold value for determining whether or not the input image is close to the characteristic of an evening scene image is adopted as THdiffsunset=24.

As such, whether the input image is a low key and an evening scene, or a low key but yet not an evening scene, is judged and determined.

The configuration described above makes it possible to speedily and highly accurately discern whether an input image is a low-key image or an under image, and, if it is a low-key image, to further discern whether it is a night scene image or an evening scene image.

Incidentally, it is possible to implement the processes if the procedures described above are configured differently, for example, with the case of judging a low-key image and an under image by operating only the circumscription pixel collection unit 10 and ending the process; the case of discerning a low-key image from an under image by operating only the circumscription pixel collection unit 10 and low level pixel collection unit 11 and ending the process; the case of discerning a low-key image from an under image by operating only the circumscription pixel collection unit 10, low level pixel collection unit 11, and low-key image judgment unit 13, and ending the process; and the case of discerning a low-key image from an under image by operating only the circumscription pixel collection unit 10, low level pixel collection unit 11, low-key image judgment unit 13, and night scene image judgment unit 14 and ending the process. While such implementations may not enable the discernments of a low-key image, a night scene, an evening scene, and the like, they certainly make it possible to speed up the process.

FIGS. 9 through 17 are process flows according to the embodiment of the present invention.

First in the step S10 (also simply noted as "S10" hereinafter), the Cout is initialized for counting the number of circumscription pixels having gradation levels less than the threshold value. In S11, the gradation level of the circumscription pixel, Pout, is collected. In S12, whether or not the gradation level of the Pout is less than a predetermined threshold value, THdark1, is determined. If the result of the S12 is "no", the process proceeds to S14. If the result of the S12 is "yes", the Cout is incremented by only '1' in S13, and the process proceeds to the S14 in which it is judged whether or not the gradation levels have been collected for all of the circumscription pixels, Pout. If the result of the S14 is "no", the process returns to the S11 to obtain the gradation levels of other circumscription pixels, Pout, and to perform the following process. If the result of the S14 is "yes", a Cout is output in S15, and the process ends.

FIG. 10 is the process flow showing the process for determining a THdark1.

The flow chart of FIG. 10 (a) shows the process for setting a threshold value, THdark1, dynamically for each image. The method for determining a threshold value, THdark1, is configured to generate a histogram representing the occurrence cumulative frequency of gradation levels of pixels as shown in FIG. 10 (b) and to determine the threshold value, THdark1, on the basis of the histogram.

First, in S20, the array Cnt [256] for forming a histogram is initialized to '0'. In S21, the gradation level value, Pix, of the pixel within the image is collected. In S22, the cumulative frequency Cnt [pix] of the gradation level, Pix, is incremented by '1'. In S23, whether or not the pixel values, Pix, of all pixels have been counted is determined. If the result of the S23 is "no", the process returns to the S21. If the result of the S23 is "yes", the process proceeds to S24.

In the S24, the threshold value, THdark1, is initialized to '0', and in S25, the cumulative frequency of a gradation level, i, is added to M. In S26, whether or not the cumulative frequency of the pixels calculated in the S25 has become no less than a predefined ratio (i.e., Rdark1; is predetermined) of the total number of pixels is determined. If the result of the S26 is "no", the gradation level, i, is incremented by '1', the process returns to the S25, and the cumulative frequency is calculated to the next gradation level. If the result of the S26 is "yes", the value of i is set to the threshold value, THdark1, and output in S28.

FIG. 11 is the process flow at the low level pixel collection unit.

In S30, a Cdark, which is a variable for counting the number of pixels of low gradation levels, is initialized to '0' In S31, the gradation level value, Pix, of an image pixel is collected. In S32, whether or not the collected gradation level value, Pix, is less than a threshold value, THdark2, is determined. The threshold value, THdark2, is predetermined or determined in the same method as shown in FIG. 10. If the result of the S32 is "no", the process proceeds to S34. If the result of the S32 is "yes", the Cdark is incremented by '1' in S33. Then in S34, whether or not the Pix of all pixels have been collected is determined. If the result of S34 is "no", the process returns to the S31. If the result of S34 is "yes", the ratio Cdark/Call is calculated by using the total number of pixels of the image to define it as Rdark in S35. Then the Rdark is output in S36, and the process ends.

Figure 12:
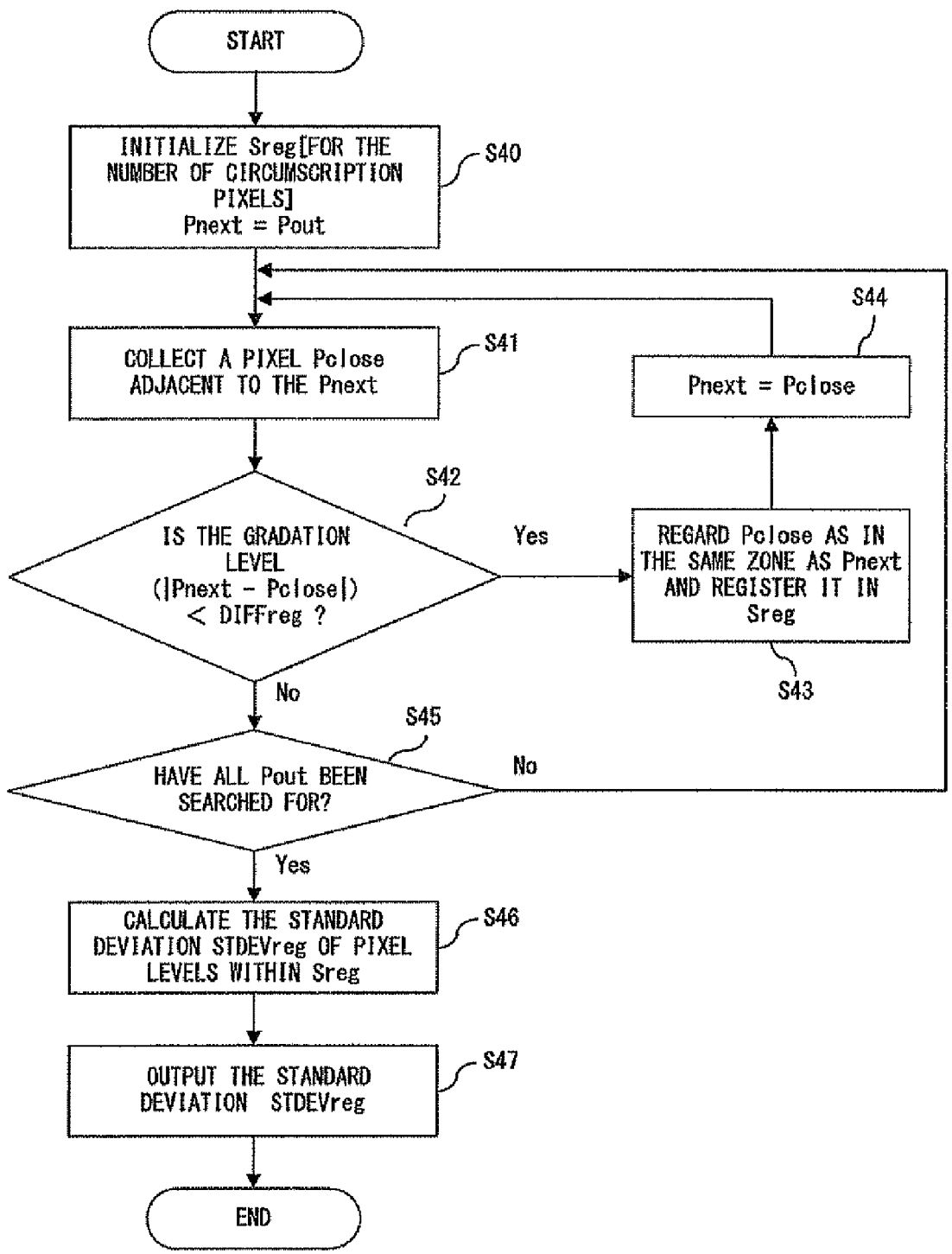
FIG. 12 is a flow chart of the process according to a preferred embodiment of the present invention (part 4)

FIG. 12 is the process flow at the circumscription pixel zone expansion unit.

First in S40, the array, Sreg, used for labeling a circumscription pixel is initialized, and a circumscription pixel, Pout, is set to a start pixel, Pnext. The Sreg are equipped for the number of circumscription pixels. In S41, the start pixel, Pnext, and the adjacent pixel, Pclose, that is adjacent to the start pixel, Pnext, are collected. In S42, whether or not the absolute value of the difference between the gradation level of the Pnext and that of the Pclose is less than a predetermined threshold value, DIFFreg, is determined. If the result of the S42 is "yes", the Pnext and Pclose are determined to belong to the same zone, and the Pclose is registered in the Sreg[Pnext]. In S44, the Pclose determined to be the same area is set to a start pixel, Pnext, anew, and the process returns to the S41. If the result of the S42 is "no", whether or not the zone expansion process has been applied to all circumscription pixel Pout is determined in S45. If the result of the S45 is "no", the process returns to the S41 and repeat the processes. If the result of the S45 is "yes", the standard deviation, STDEVreg, of gradation levels within the Sreg is calculated for each start pixel in S46 to output it in S47, and the process ends.

Figure 13:
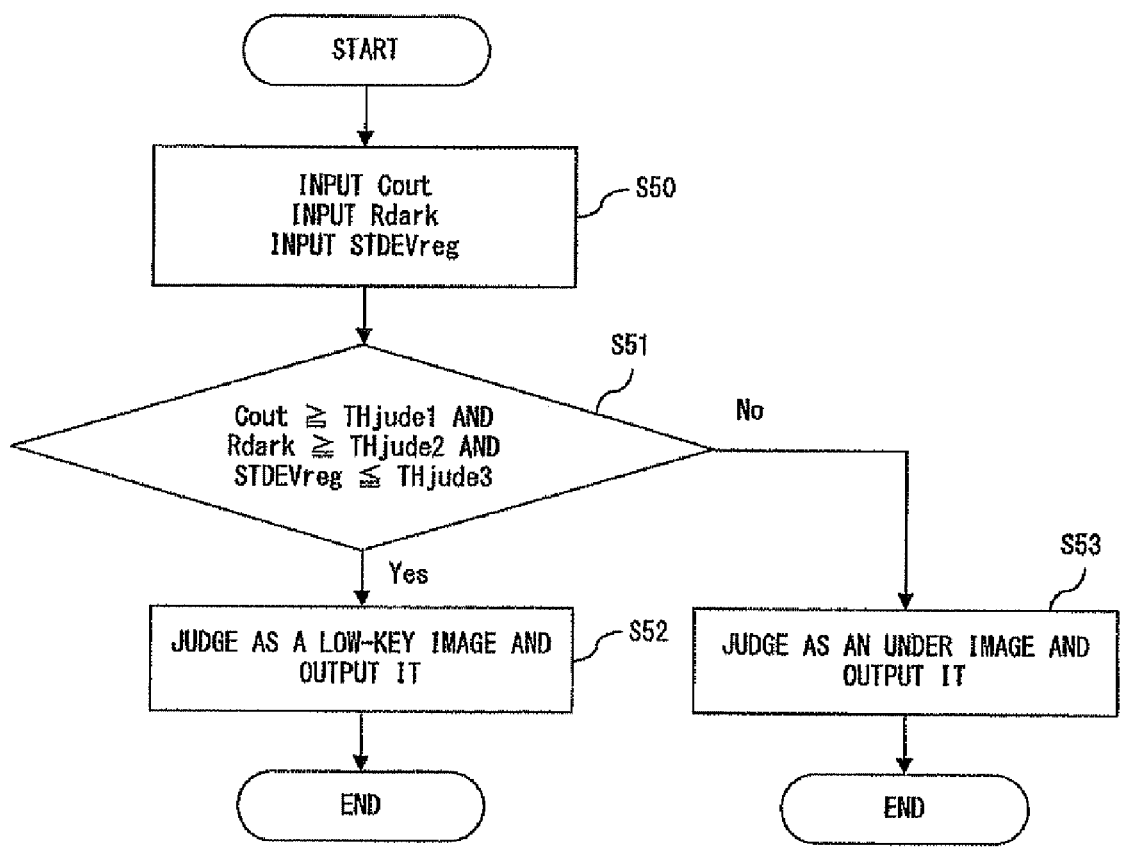
FIG. 13 is a flow chart of the process according to a preferred embodiment of the present invention (part 5)

FIG. 13 is the process flow at the low-key image judgment unit.

In S50, the Cout, Rdark, and STDEVreg calculated as described above are input, and whether or not the Cout, Rdark and STDEVreg are no less than threshold values THjudge1, THjudge2 and THjudge3, respectively, in S51. Here, the threshold values THjudge1, THjudge2 and THjudge3 are predetermined. If the result of the S51 is "yes", the image is judged to be a low-key image and the result is output in S52. If the result of the S51 is "no", the image is judged to be an under image and the result is output.

Figure 14:
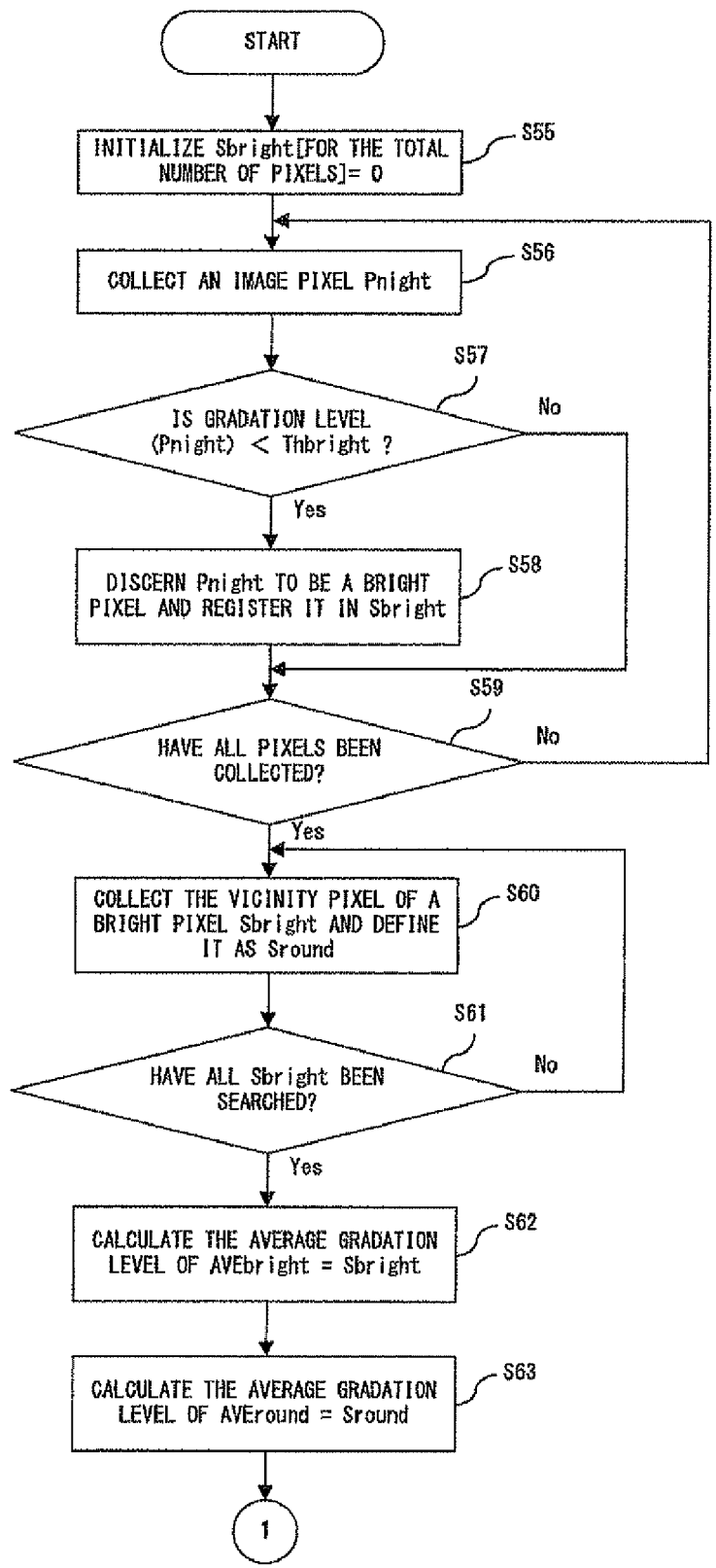
FIG. 14 is a flow chart of the process according to a preferred embodiment of the present invention (part 6)
Figure 15:
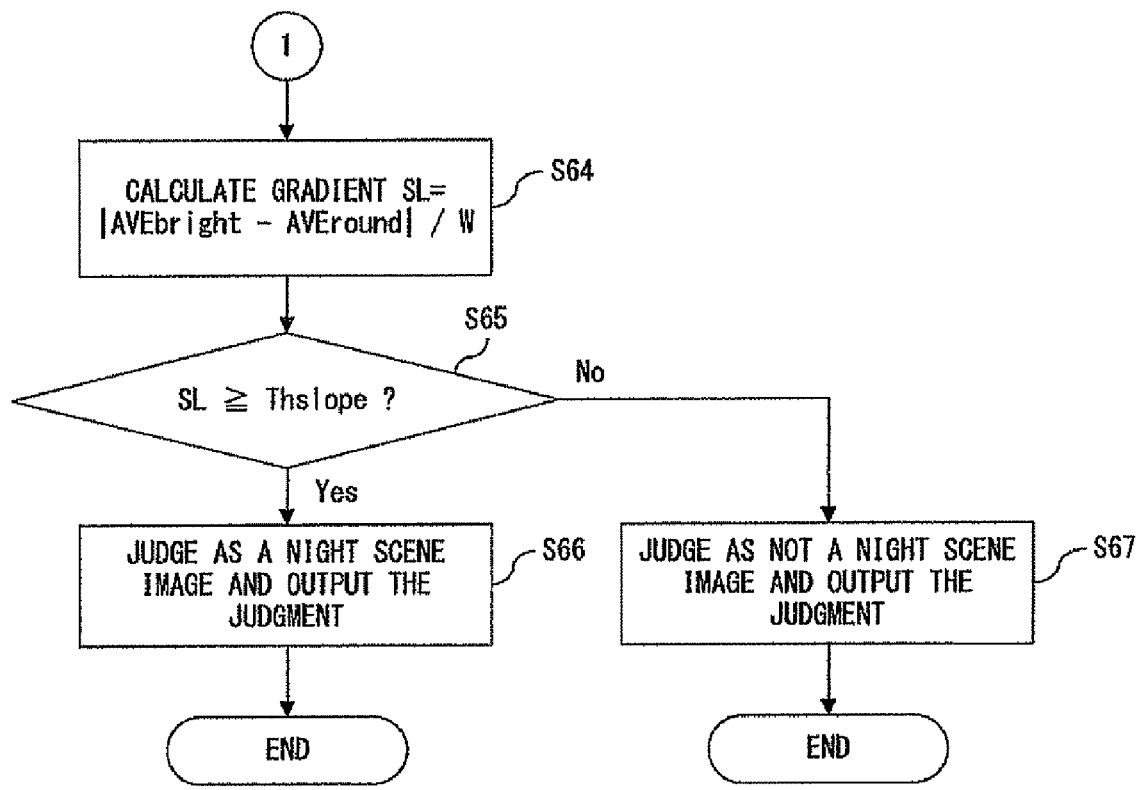
FIG. 15 is a flow chart of the process according to a preferred embodiment of the present invention (part 7)

FIGS. 14 and 15 show the process flow at the night scene image judgment unit.

In S55, the arrays, Sbright, used for registering bright pixels within the image are provided for the total number of pixels, and they are initialized to '0'. In S56, the gradation level of a pixel, Pnight, is collected. In S57, whether or not the gradation level of the pixel, Pnight, is greater than a THbright is determined. The THbright may be predetermined or it may be determined for each image in the same method as shown in FIG. 10. If the result of the S57 is "no", the process proceeds to S59. If the result of the S57 is "yes", the Pnight is discerned to be a bright pixel, and it is registered in the Sbright in S58. In S59, whether or not the gradation levels are collected and processed for all pixels is determined. If the result of the S59 is "no", the process returns to the S56 to repeat the processes. If the result of the S59 is "yes", the process proceeds to S60.

In the S60, the vicinity pixel of the bright pixel, Sbright, is collected and defined as Sround. In S61, whether or not the process of obtaining the vicinity pixel for all the Sbright have been carried out is determined. If the result of the S61 is "no", the process returns to the S60 for collecting the vicinity pixel(s). If the result of the S61 is "yes", the average gradation level of the pixels belonging to the Sbright is calculated in S62. In S63, the average gradation level of the pixels belonging to the Sround is calculated. In S64, the gradient between the gradation levels of a bright pixel and that of the vicinity pixel is calculated on the basis of the following expression:

$$\text{Gradient } SL = |AVEbright - AVEround|/W;$$

where W is the width of a window used when collecting the vicinity pixel.

If a zone expansion process is used in lieu of a window when collecting the vicinity pixel, the W is '1'.

In S65, whether or not the SL is no less than a pre-set threshold value, THslope, is determined. If the result of the S65 is "yes", the image is determined to be a night scene image, and the result is output in S66. If the result of the S65 is "no", the image is determined to be not a night scene image, and the result is output.

Figure 17:
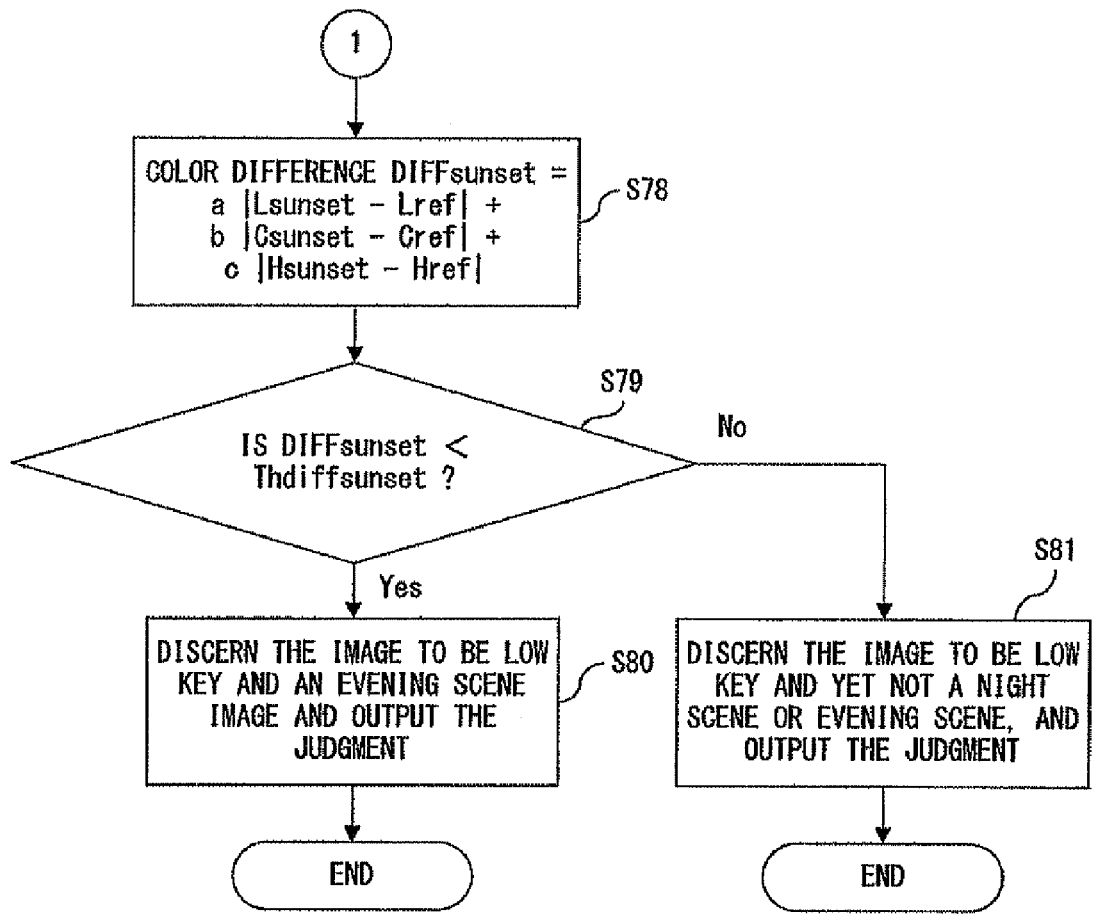
FIG. 17 is a flow chart of the process according to a preferred embodiment of the present invention (part 9).

FIGS. 16 and 17 show the process flow of the evening scene image judgment unit.

In S70, the arrays, Ssunset, which are for registering pixels used for judging an evening scene, are provided for the total number of pixels, and they are initialized to '0'. The pixel of the image is collected as Psunset in S71, and it is judged in S72 whether or not the gradation level of the pixel, Psunset, is greater than a predetermined THsunset. If the result of the S72 is "no", the process proceeds to S74. If the result of the S72 is "yes", the aforementioned pixel Psunset is determined to be a bright pixel and registered in an Ssunset in S73. In the S74, whether or not all the pixels of the image have been collected and processed is determined. If the result of the S74 is "no", the process returns to the S71. If the result of the S74 is "yes", the average luminosity, Lsunset, of all bright pixels registered in the Ssunset is calculated in S75. In S76, the average chroma, Csunset, of the bright pixels of the Ssunset is calculated. In S77, the average hue of the bright pixels of the Ssunset is calculated. In S78, a color difference, DIFFsunset, is calculated by the following expression:

$$DIFFsunset = a|Lsunset - Lref| + b|Csunset - Cref| + c|Hsunset - Href|;$$

where a, b, and c are weighted factors for determining which term of the above expression is to be emphasized, with the Lref being the reference value of the average luminosity, the Cref being the reference value of the average chroma and the Href being the reference value of the average hue. Each reference value is pre-calculated and pre-set by using the typical evening scene image.

In S79, whether or not the DIFFsunset is less than a predetermined threshold value, THdiffsunset, is determined. If the result of the S79 is "yes", the image is determined to be a low-key image and an evening scene image in S80, and the result is output. If the result of the S79 is "no", the image is determined to be a low-key image but not a night scene or evening scene, and the result is output.

The image discernment method according to the preferred embodiment of the present invention described above is applicable to an apparatus and application program that both handle images, such as digital cameras, image scanners, printers, and image systems of newspapers and desk top publishing (DTP).

What is claimed is:

1. An image discernment apparatus, comprising:
   a count unit to count the number of pixels, of which the gradation levels are smaller than a predefined first threshold value, from among pixels positioned in the periphery of the image;
   a discernment unit to discern an image to be of an appropriate gradation, even if the image is in a dark tone, if the number of pixels, as a result of the counting, is not less than a second threshold value; and
   a ratio calculation unit to calculate the ratio of the number of pixels calculated by said count unit to the total number of pixels positioned in the surroundings of said image, wherein
   said discernment unit discerns an image to be of an appropriate gradation even if the image is in a dark tone if the ratio is not less than a predefined third threshold value.

2. The image discernment apparatus according to claim 1, further comprising:
   a surrounding pixel extraction unit to extract in the surrounding zone the pixels with a gradation level similar to that of pixels with the gradation levels less than a first threshold value; and a gradation change calculation unit to calculate a change in gradation among pixels in an inside of the obtained surrounding zone, wherein said discernment unit discerns an image to be of an appropriate gradation even if the image is in a dark tone if the change in gradations is not greater than a predefined fourth threshold value.

3. The image discernment apparatus according to claim 2, further comprising:

a gradation level change gradient calculation unit to calculate a gradient of the change in gradation levels between the pixel zone, in which said gradation level is greater than a value, and a pixel zone of the surrounding of the aforementioned pixel zone, in which the gradation level is greater than the value, wherein an image is discerned to be a night scene image with an appropriate gradation even if the image is in a dark tone if the change gradient of the gradation levels is not less than a fifth threshold value.

4. The image discernment apparatus according to claim 3, further comprising:

a comparison unit to compare at least one of the average values of luminosity, chroma, and hue within a pixel zone, in which the gradation level is greater than a comparison value, with at least one of the corresponding values of the luminosity, chroma, and hue of a typical evening glow image, wherein an image is discerned to be an evening glow image with an appropriate gradation even if the image is in a dark tone if both are determined to be similar to each other as a result of the comparison.

5. The image apparatus according to claim 1, wherein said gradation level is the gradation level of luminosity.

6. The image apparatus according to claim 1, wherein said gradation level is the respective gradation level of luminosity, chroma, and hue.

7. The image apparatus according to claim 1, wherein said gradation level is the respective gradation levels of a red (R) value, a green (G) value, and a blue (B) value when a pixel value is expressed by an RGB value.

8. An image discernment method for discerning whether or not the gradation of an image, of which the entire image is in a dark tone, is appropriate, comprising:

counting a number of pixels, of which gradation levels are less than a first threshold value, among pixels which circumscribe an image zone in which the entire image is displayed;

calculating the ratio of the number of pixels calculated by said count step to the total number of pixels positioned in the surrounding of said image, and wherein discerning includes discerning an image to be of an appropriate gradation level of the image is in a dark tone if the ratio is not less than a predefined third threshold value; and discerning an image to be of an appropriate gradation even if the image is in a dark tone if the number of pixels as a result of the counting is not less than a second threshold value.

9. The method of claim 8, wherein
said gradation level is the gradation level of luminosity.

10. The method of claim 8, wherein
said gradation level is the respective gradation level of luminosity, chroma, and hue.

11. The method of claim 8, wherein
said gradation level is the respective gradation levels of a red (R) value, a green (G) value, and a blue (B) value when a pixel value is expressed by an RGB value.

12. A computer readable, non-transitory storage medium storing a program for making the computer execute an image discernment method for discerning whether or not the gradation of an image, of which the entire image is in a dark tone, is appropriate, wherein the program makes the computer execute the processes for counting the number of pixels, of which the gradation levels are less than a predefined first threshold value, among the pixels which circumscribe an image zone in which the entire image is displayed;

calculating the ratio of the number of pixels calculated by said count step to the total number of pixels positioned in the surrounding of said image, and wherein discerning includes discerning an image to be of an appropriate gradation level of the image is in a dark tone if the ratio is not less than a predefined third threshold value; and discerning an image to be of an appropriate gradation even if the image is in a dark tone if the number of pixels as a result of the counting is no smaller than a second threshold value.

* * * * *